May 24, 1960     F. A. F. SCHMIDT     2,937,498
MECHANICALLY CONTROLLED MULTISTAGE COMBUSTION
CHAMBERS FOR GAS-IMPULSE-TYPE ENGINES AND
IMPROVED DISCHARGE CONTROL THEREFOR
Filed Jan. 13, 1954     5 Sheets-Sheet 1

INVENTOR
FRITZ A. F. SCHMIDT
BY Burgess & Dinklage
ATTORNEYS

INVENTOR
FRITZ A. F. SCHMIDT
BY
Burgess & Dinklage
ATTORNEYS

May 24, 1960 F. A. F. SCHMIDT 2,937,498
MECHANICALLY CONTROLLED MULTISTAGE COMBUSTION
CHAMBERS FOR GAS-IMPULSE-TYPE ENGINES AND
IMPROVED DISCHARGE CONTROL THEREFOR
Filed Jan. 13, 1954 5 Sheets-Sheet 5

INVENTOR
FRITZ A. F. SCHMIDT
BY Burgess & Dinklage
ATTORNEY

2,937,498

MECHANICALLY CONTROLLED MULTISTAGE COMBUSTION CHAMBERS FOR GAS-IMPULSE-TYPE ENGINES AND IMPROVED DISCHARGE CONTROL THEREFOR

Fritz A. F. Schmidt, Dr. Seitz Strasse 33-K, Murnau, Upper Bavaria, Germany

Filed Jan. 13, 1954, Ser. No. 403,686

Claims priority, application Germany Jan. 13, 1953

20 Claims. (Cl. 60—39.39)

This invention relates to new and useful improvements in gas-impulse-type engines. It more particularly relates to a novel construction for aircraft jet engines, pulse jets, or gas turbines which will be generically referred to herein as gas-impulse-type engines.

One feature of the invention relates to a mechanically controlled multi-stage combustion chamber for aircraft jet engines, pulse jets, or gas turbines.

A further feature of the invention relates to a discharge control for intermittently operating combustion chambers of gas-impulse-type engines.

Gas-impulse-type engines which operate with an intermittent variation of the speed of the discharging impulse gas stream generally will not operate efficiently at very high speeds. This is due to the fact that the construction allows only a small pressure development and therefore a relatively low gas stream velocity. In addition, engines of this type have a very high fuel consumption, due to the fact that the combustion takes place with a relatively small excess of air, so that the quantity of fuel is relatively large as compared with the impulse obtained.

In general, the combustion chambers for jet engines, as, for example, the turbo-jet type, and for gas turbines operate on the principle of a constant pressure combustion. The amount of gas required in these engines is relatively large, due to the required excess of air. In order to pass this large mass of gas through the engines, and to hold the dimensional design within tolerable limits, the gases must pass through the combustion chambers at relatively high flow speeds. These high-gas-flow speeds in turn necessitate a considerable pressure drop in the combustion chamber. This loss of pressure must be compensated for by a compressor positioned ahead of the combustion chamber. The use of this compressor, of course, increases the fuel consumption and decreases the output of the engine.

In gas-impulse-type engines, which operated with a constant pressure combustion chamber, as, for example, a gas turbine, the combustion was initiated in a primary section of the combustion chamber approximately in the vicinity of the theoretical mixture of fuel and air required for the combustion. In the gas turbine, the temperatures in front of the nozzles are not permitted to exceed 700 to 1,000° C., due to the physical properties of the materials used for construction. For this reason, a multiple of the quantity of primary combustion air has to be subsequently added as secondary air in the secondary section of the combustion chamber to keep the temperatures within the tolerable limit. Due to this subsequent introduction of air, considerable variations in the temperature distribution cannot be avoided. It was generally not considered desirable to increase the uniformity of temperature distribution by turbulence due to the additional pressure loss incurred therewith. The highest temperature occurring in the combustion chamber generally occurs in the core of the combustion mass, and in many cases may be about 10% higher than the mean temperature. The limits of the thermal stresses exerted on the material are determined by these highest temperatures rather than by the mean temperature. On the other hand, the output, which is roughly proportional to the absolute temperature of the working gas, is a function of the lesser mean temperature, and not of the maximum temperature, the upper limit of which is restricted by the strength of the materials used for construction.

It therefore follows that the constant pressure combustion chambers used, for example, in gas turbines have the disadvantages of loss of output due to loss of pressure and additional loss of output due to irregular distribution of temperature.

Consequently, in the design of gas turbines, it was endeavored to construct the same with constant volume combustion chambers and thus attain the advantages of output and consumption of the constant volume combustion principle. In constant volume combustion chambers, the combustion takes place intermittently, while the combustion space is completely or partially closed during the combustion. Generally, the closure of the combustion chamber is effected during the combustion cycle by valve-like mechanism. These, however, on the one hand, cause large throttling losses and require a relatively long time for the gas transfer. On the other hand, these chambers are relatively prone to trouble, due to the high operational frequencies. Output from these chambers is delivered through the intermittently charged turbine or pulsating jet thrust.

In accordance with other proposals, a multiple number of combustion chambers are annularly arranged about a central axis and closed by rotating members in sequence. Combustion is effected in these closed chambers solely for the purpose of developing pressure, and no precompression or very little is provided. In addition, it has been suggested to locate the combustion space in a recess of the revolving rotor or to close the combustion chambers by rotating control members driven by gears from the main shaft. In these cases, expansion generally takes place in a collector in which approximately constant pressure is maintained.

Gas-impulse engines, having intermittently operating combustion chambers, generally operate in such a manner that the gases discharging from each chamber onto the nozzles of a turbo-drive or the like were generally discharged uniformly over the entire length of the blades. This leads to relatively high stresses on the lower portions of the blades. With approximately uniform temperature over the length of the turbine blade, the ratio of stress to permissible stress near the root section is materially higher at the root section than at the upper portion of the blade, due to higher centrifugal forces. Proposals have been made to better utilize the strength of the material available, and to obtain uniform stresses by charging the blade in the radial direction with gas streams of various temperatures with the lowest temperature at the root of the blade where the stresses are highest. This, however, requires the generation of various gas streams independent of each other in individual combustion chambers. In addition, proposals have been made for subdividing the nozzles in the radial direction, so as to avoid twisting of the blades by utilizing a smaller pressure drop near the root than at the blade tip. This, however, also requires two separate combustion chambers.

One object of this invention is an engine of the gas-impulse type with an intermittently operating substantially constant volume combustion chamber or chambers which will obtain relatively higher discharging speeds and simultaneously reduce the fuel consumption.

A further object of this invention is a discharge control for intermittently operating combustion chambers of gas-impulse-type engines which will discharge the gases in sequence into two or more transfer channels which lead to radially separate nozzle sections of a gas turbine or partially to a thrust jet and partially to a radially separated nozzle section of a gas turbine. These, and still further objects will become apparent from the following description, read in conjunction with the drawings, in which:

In accordance with one feature of the invention, the combustion chamber for gas-impulse engines is subdivided into a primary and secondary chamber. Both the primary and secondary chambers have rotating control members, such as rotating discs for closing the inlet and discharge openings. The combustion chamber system of the gas-impulse engine preferably comprises a multiple number of annularly arranged pairs of primary and secondary chambers.

The primary combustion chamber has an air-inlet opening and an outlet opening which leads into the secondary chamber. The primary chamber is preferably at least partially positioned within the secondary chamber. Means are provided for injecting fuel and igniting the fuel in the primary chamber. Rotating control means, such as rotating discs, are provided for closing the intake opening and outlet opening of the primary combustion chamber at least to such a degree that pressure losses due to leaks are kept within tolerable limits. In this manner, the combustion within the primary combustion chamber is effected in a manner which at least approximates a combustion event effected in accordance with the constant volume combustion principle. After the combustion in the primary chamber, the rotating control member, such as the rotating disc, which controls the outlet from the primary chamber into the secondary chamber, opens, so that the partially, or even largely burnt combustion gases pass into the secondary combustion chamber with a great deal of turbulence. The inlet and outlet of the secondary chamber are controlled in a similar manner with rotating control members such as rotating discs. After the entrance of the combustion gases into the secondary combustion chamber and mixture with the air therein, due to the turbulent flow, the outlet from the secondary chamber is opened by means of the rotating control member, and the gases flow with decreasing pressure, either into a thrust jet, the nozzles of a gas turbine, or both. As soon as the pressure is dropped to the pressure of the charging air, the rotating control member which controls the intake to the secondary chamber, opens to admit air into this chamber. Contrary to a combustion chamber which operates on the constant pressure principle, the combustion chamber design, in accordance with the invention, does not show any appreciable pressure loss, but the combustion gases flowing with variably decreasing pressure from the combustion chamber have a materially higher mean pressure than the pressure of the air passed into the combustion chamber. In combustion chambers which operate in accordance with the constant pressure principle, the combustion gas which discharges from the combustion chamber has a somewhat lower pressure than the air being passed into the chamber. In the construction in accordance with the invention, only that portion of the gases which are discharged from the chamber during scavenging have a somewhat lower pressure than the entering air.

The construction in accordance with the invention allows a materially higher output than was previously obtainable with constant pressure combustion chambers. This is due to the higher mean pressure obtainable in the higher permissible temperature due to the larger expansion ratio of the discharging gases from the chamber.

In the construction in accordance with the invention large amounts of energy are converted into gas-flow velocity during the gas flow from the primary combustion chamber to the secondary combustion chamber. The resulting high-flow velocities are partially utilized to produce high turbulence in the secondary combustion chamber. This high turbulence causes a highly desirable uniform temperature distribution. Due to this uniform temperature distribution, the mixing of additional quantities of gases previously required for temperature control and having associated therewith pressure and output loss, is no longer necessary.

In the drawings, Figs. 1 through 4, relate to an embodiment of the new combustion chamber construction in accordance with the invention.

Figures 1, 1A, 3A, 4:
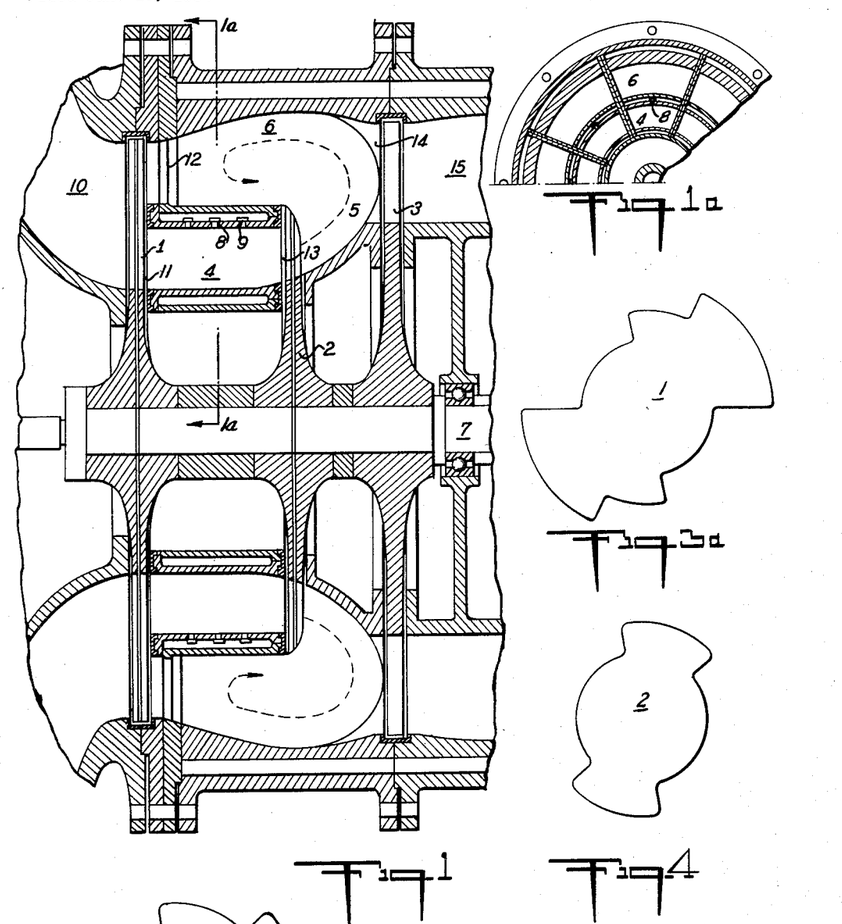
Fig. 1 is a diagrammatic vertical section of an embodiment of an intermittently operating multi-stage combustion chamber for a gas-impulse-type engine.
Fig. 1a is a cross section of the embodiment as shown in Fig. 1.
Figs. 3 and 3a show embodiments of the shape of the intake control disc in the combustion chamber shown in Fig. 1.
Fig. 4 shows an embodiment of the shape of the discharge control disc of the primary combustion chamber in the embodiment as shown in Fig. 1.

As shown in Fig. 1, the shaft 7 extends axially through the center of the engine. Arranged annularly about the axis of the shaft 7 and of the engine, there are a number of combustion chamber units comprising the primary combustion chamber 4 and secondary combustion chamber 6. These combustion chamber units are preferably symmetrically positioned equidistant from each other and from the central axis of the engine.

Figure 3:
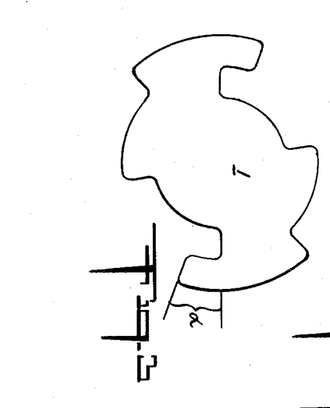

The primary and secondary combustion chambers 4 and 6 have inlet openings 11 and 12, respectively, which are connected to the air duct 10. The primary combustion chamber 4 has an outlet opening 13, which leads into the secondary combustion chamber 6. The secondary combustion chamber 6 has an outlet opening 14, which leads into the duct 15. The duct 15 may be connected to a thrust jet, a gas turbine, or a thrust jet and gas turbine. The inlets 11 and 12 are opened and closed by the rotating control member in the form of the rotating control disc 1, which is connected for rotation with the shaft 7. The control disc 1 may, for example, have a shape as shown in Figs. 3 and 3a, as will be explained later. As the control disc 1 is rotated with the shaft 7, it will alternately open and close the inlets to the various primary and secondary combustion chambers 4 and 6 annually positioned about the axis of the shaft 7.

The outlet 13 of the primary combustion chamber which leads into the secondary combustion chamber is alternately opened and closed by means of the control disc 2, which is also connected to and rotates with the shaft 7. Each of the annularly positioned primary chambers 4 is controlled by this single control disc 2. The shape of this disc is, for example, illustrated in Fig. 4.

The outlets 14 for the various annually positioned secondary combustion chambers 6 are alternately opened and closed by the control disc 3, which likewise is connected to the shaft 7 and rotates therewith. The shape of this control disc may, for example, be similar to the control disc 2.

The primary combustion chambers 4 are provided with fuel injection means, such as the nozzles 8, for injecting fuel into the chamber under pressure. These may be of any conventional known construction. Additionally provided in the primary combustion 4 an ignition means, as, for example, one or more spark plugs 9. The shaft 7 is rotated, as, for example, by turbine blades or in any other known conventional manner and the timing of the fuel injection and ignition is timed with the rotary speed of the shaft 7, and thus is in synchronization with the rotary speed of the control discs 1, 2, and 3.

In operation, the primary combustion chamber 4 is scavenged with precompressed air passed in through the air duct 10. The control discs 1 and 2 thereafter close the inlet 11 and outlet 13, respectively. Fuel is injected into the chamber through the nozzle 8 and ignited by one or more of the spark plugs 9. The combustion takes place in a closed, volume-confined chamber. After the combustion of the mixture the control disc 2 opens the outlet 13 and the combustion gases flow with heavy turbulence into the secondary chamber 6, which is closed at its inlet side 12 by the disc 1 and outlet side 14 by the disc 3. The inlet 11 to the primary combustion chamber 4 remains shut by the control disc 1 during the passage of the gas through the outlet 13 from the primary to the secondary chamber. Due to the high turbulence in the secondary chamber 6, an intimate mixing of the combustion gases from the primary combustion chamber 1 with the air in the secondary chamber 6 occurs and an extremely uniform temperature distribution within the chamber 6 is effected.

Finally, the control disc 3 opens the outlet 14 from the secondary chamber 6 and the combustion gases flow into the conduit 15 to a thrust jet, turbine, or both. The inlets 11 and 12 are then opened for scavenging by the air flowing through the pipe line 10. The mass inertia of the gases flowing from the primary chamber 4 into the secondary chamber 6 may create a partial vacuum in the primary chamber. It is therefore possible to open the primary chamber for scavenging ahead of the secondary chamber. The scavenging and charging are accelerated by this negative pressure. As has been mentioned, a single set of rotating control discs 1, 2, and 3 actuates the working cycle of all the annularly arranged combustion chambers in rotating sequence.

Figure 2:
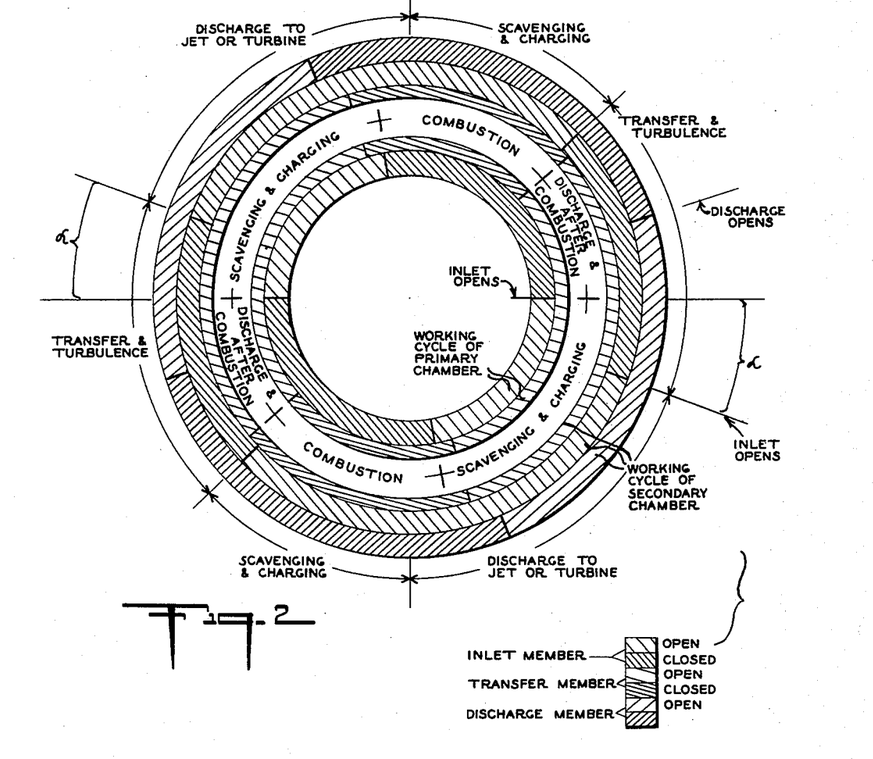
Fig. 2 is a control diagram of the inlet control for the combustion chamber shown in Fig. 1.

The operating sequence of the control disc 1 in opening and closing the primary and secondary combustion chambers is shown in diagram in Fig. 2. The outer ring illustrates the opening and closure of the inlet 12 by the disc 1 and the inner ring indicates the opening and closure of the inlet 11 by the disc 1.

The angular difference between the opening of the inlet 11 by the disc 1 and the opening of the inlet 12 by the disc 1 is indicated by the phase angle $\alpha$ in the diagram in Fig. 2.

If each associated primary and secondary chamber is positioned in radial alignment with each other, then the control disc 1 must have a projection to compensate for this phase angle $\alpha$. This is indicated in Fig. 3. It is, however, disadvantageous to have these projections, as the same are not well adapted for centrifugal and thermal stresses. This control disc may be more advantageously designed for these stresses if the inlets 11 and 12 of the associated primary and secondary combustion chambers are angularly off-set from each other in the plane of rotation of the disc 1 by the angle $\alpha$. This may be effected, for example, by off-setting the primary and secondary chambers with respect to each other by this angle. With the inlets 11 and 12 so off-set, the control disc assumes a shape as shown in Fig. 3a, which eliminates the undesirable projections as shown in Fig. 3.

With the rotating control members in accordance with the invention, the intake and discharge areas may be several times larger than those of valve control combustion chambers. The drive of the control members as illustrated, is preferably effected by mounting the discs directly on the shaft. The shape of the control members is, of course, suggested by the thermo-dynamic sequence of the cycle. The control discs 1, 2, and 3 may be made hollow for cooling. It is also possible to provide these control discs with cooling channels which extend outwardly from the shaft, as is illustrated, for example, with respect to control discs 1 and 2. These cooling channels, for exampe, may be provided with cooling fins. The cooling air is passed through these cooling channels by centrifugal force. Heated air is returned again to the gas flow and in this manner the heat carried away by cooling is fully returned to the system. It is also possible, depending upon the specific construction and application, to use other cooling media, as, for example, water.

The discharge channel may be designed according to the shape of the rotating elements in such a manner that the combustion gases will exert rotary impulses upon the control elements, in a similar manner to a gas turbine runner, while they are discharging from the primary and possibly from the secondary combustion chambers and while they are passing through the rotating discharge control members, so that a portion of the transfer flow energy is utilized for driving these elements.

If the discharge from the combustion chamber 6 passing through the receiver conduit 15, is passed into nozzles and uniformly over the entire length of a turbine blade as is customary for turbines turned by intermittently operating combustion chambers, relatively high stresses are caused on the lower parts of the blades.

In accordance with a further feature of the invention, a discharge control is provided for intermittently operating combustion chambers of impulse-type gas engines, such as chambers operating as described above, or any other intermittently operating combustion chambers of aircraft jet engine pulse jets, or gas turbines having a pressure drop during the discharge event from the combustion chamber system. The discharge control in accordance with this feature of the invention is one or several rotating control members or discs with suitable channels or cut-outs, which controls the discharge event of several combustion chambers operating substantially identically, but not simultaneously, so that the gases are discharged in chronological sequence through two or more transfer channels which lead to radially separated nozzle sections of a gas turbine or partially to a thrust jet and partially to radially separated nozzle sections of a gas turbine.

In accordance with a basic feature of the new discharge control, the heat content of the gases emitted from the intermittently operating combustion chambers is reduced and work is obtained in several steps by utilizing the resulting gas velocities in a radially sectionalized nozzle ring of the gas turbine. This sub-divides the discharge event into several component parts which operate in steps of decreasing pressures, but which work with a single turbine wheel or with a turbine wheel and a thrust jet. This permits the utilization of the greater energy available from the portion of the gases expanding from initially higher pressures. Of these higher pressures, only a portion of the discharge is at first opened, which feeds into a system of channels leading to the outer turbine blade sections. When a lower pressure is reached in the combustion chamber during the gas discharge, the first discharge opening is closed and a second one opened by rotating control members, such as control discs. The second discharge opening feeds into a second system of channels leading to the inner turbine blade sections. The discharge event could, of course, be further subdivided into additional steps, if desired, each feeding into its own channel system, and leading to its respective section of the turbine blades.

It is thus possible, in accordance with this feature of the invention, to pass the combustion gases at higher temperatures to the outer circumference of the turbine wheel by means of a rotating discharge control member of an intermittently operating combustion chamber. In addition, the portions of the discharging gases issuing with higher pressure from the combustion chamber at the beginning of the discharge event are led to the outer sections of the radially sectionalized nozzle ring. This results in charging the outer portion of the turbine blades with a higher expansion ratio, so that the angle of admission becomes more uniform along the leading edge of the blade and the twist or change in pitch of the blade is eliminated under certain conditions. This feature of the invention is particularly adaptable in connection with combustion chambers in which a considerable change of pressure takes place during discharge from the combustion chambers, as, for eexample, in the case of intimately operating combustion chambers of the type described above.

In the case of turbines which operate with several stages, the nozzle systems between the respective stages may be sectionalized in a similar manner in the direction of the blade, so as to obtain in these additional stages a similar velocity distribution as described above, which permits the use of straight blades in the first turbine wheel rather than blades of varying pitch. This may be effected by suitably dividing the pressure drops of the gas flow through the outer and inner sections of the turbine blades.

The combustion chambers and discharge control in accordance with the invention may be so arranged that the rotating control member will continuously discharge gases from several, annularly arranged, individual combustion chambers into the nozzle channel system, which will result in a practically continuous gas flow.

The same control system may also be used in connection with pure pulse jets by channelling a suitable partial flow from either the high or low pressure stage to an auxiliary gas turbine used to drive the control system. This auxiliary gas turbine may also be dimensioned and utilized to drive an additional single or two-stage compressor positioned in front of the combustion chamber which will materially improve the scavenging of the combustion chamber system. In addition, an increase of output will be obtained from this super-charging and higher speeds can be obtained due to the higher pressure ratio as compared with that of an ordinary expansion chamber.

This feature of the invention will be described in further detail with reference to the embodiments shown in Figs. 5 through 13 of the drawings. Referring to the embodiment shown in Figs. 5, 6, and 7, a multiple number of intermittently operating combustion chambers 21 of, for example, the type illustrated in Fig. 1, are annularly positioned around the central axis 16 of the engine, and preferably equidistantly positioned from this axis and from each other. The discharge passage from the combustion chamber 21 branches off into two transfer channels 22 and 27. The exits from the transfer channels 22 and 27 are positioned in a common plane extending transversely through the engine, but the channel 22 is positioned radially outwardly from the channel 27. The channel 27 is also angularly displaced in the common plane, i.e., twisted with respect to the channel 22 for a reason which will be explained later. Extending co-axially with the axis of the engine is a rotatable shaft 17. A control disc 23 is connected for rotation with the shaft 17 and moves in the plane just in front of the exits from the transfer channels 22 and 27. This disc 23 has, for example, the shape shown in Fig. 13a. The notches shown on either side of the disc are of sufficient depth to extend past both the transfer channels 22 and 27. As the disc 23 rotates with the shaft 17, the solid portion of the disc will close the channels 22 and 27, and as the notch passes these transfer channels, it will in chronological sequence open the channel 22, close the channel 22, open the channel 27 and close the channel 27. On the side of the control disc 23 opposite the transfer channels 22 and 27 there are two annularly concentric receivers 24 and 28. Discharging gas passing from the transfer channel 22 through the notch in the control disc 23 will pass through the receiver 24. Discharge gas from the transfer channel 27 will pass into the annular receiver 28. A nozzle ring 25 is positioned at the discharge end of the receiver 24 and a nozzle ring 29 is positioned at the discharge end of the receiver 28. Positioned just behind these concentric nozzle rings 29 and 25 is a ring of turbine blades 26, which is connected for rotation with the shaft 17.

Figures 12, 13, 13A:
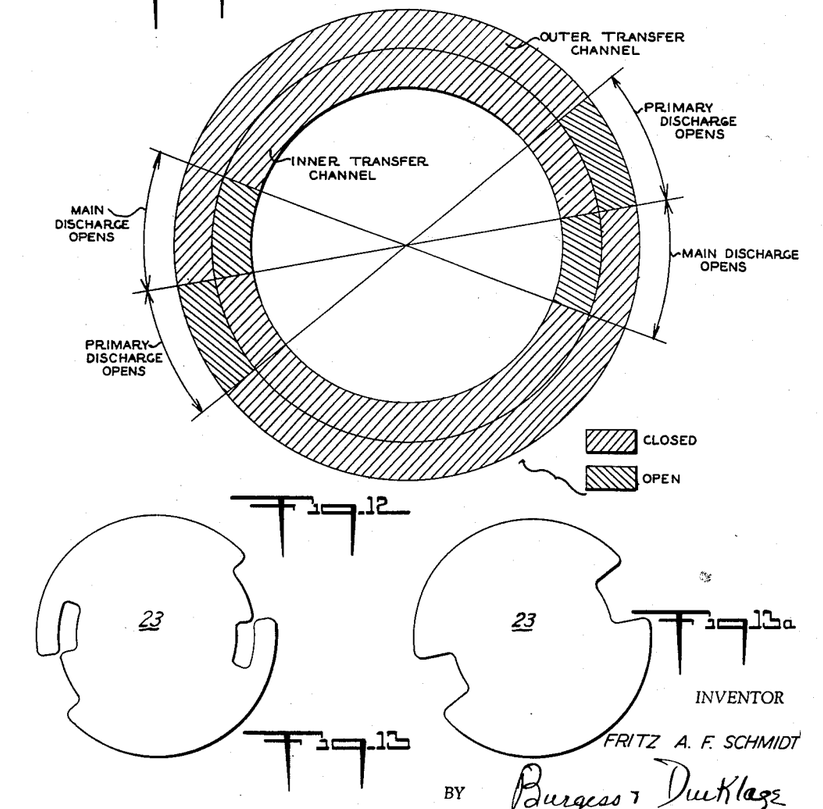
Fig. 12 is a control diagram showing the operation of a discharge control in accordance with the invention.
Fig. 13 shows an example of the shape of a discharge control disc with a radial arrangement of the transfer channel in accordance with the invention.
Fig. 13a shows the shape of the discharge control disc with a twisted arrangement of the transfer channel.

It should be noted that the transfer channel 27 is twisted with respect to the transfer channel 22, so that in the direction of rotation of the control disc 23, the trailing edge of the transfer channel 22 is just radially in line with the leading edge of the transfer channel 27. With this positioning, a single notch in the control disc 23, as illustrated in Fig. 13a, will in sequence open the channel 22, close channel 22, open channel 27, and close channel 27. If the transfer channels 22 and 27 were radially aligned in order to effect this sequence of operation, the control disc 23 will have to have a shape as illustrated in Fig. 13. This shape, as may readily be seen, is not well adapted for centrifugal and thermal stresses.

Figure 5:
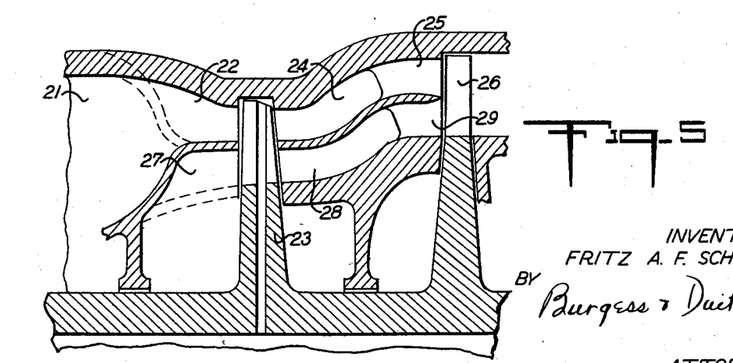
Fig. 5 is a diagrammatic vertical section of an embodiment of a discharge control for intermittently operating combustion chambers of gas-impulse-type engines in accordance with the invention.
Figure 6:
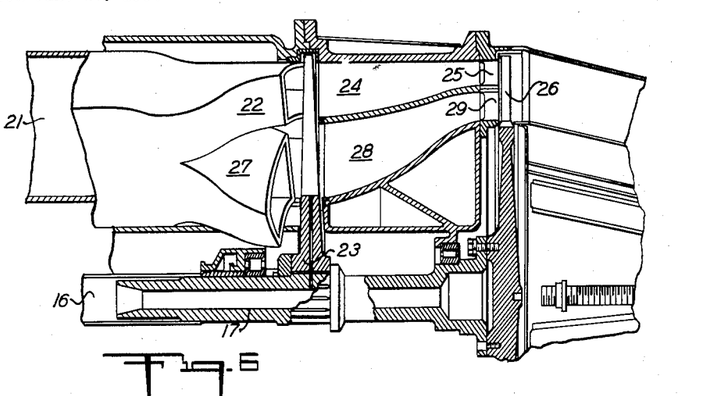
Fig. 6 is a vertical cross-section of the engine diagrammatically represented in Fig. 5 with some of the elements in elevation.
Figure 7:
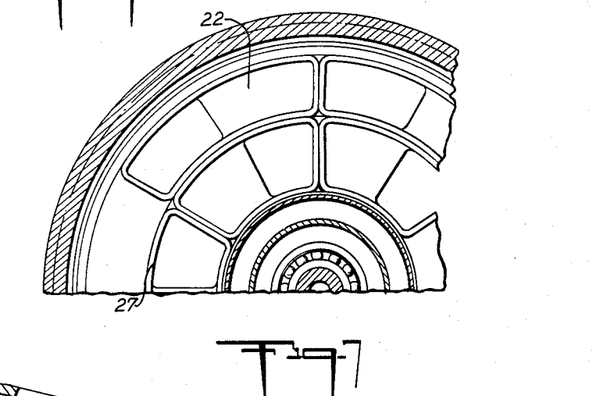
Fig. 7 shows a cross-section through Fig. 6.

In operation, the working gas flows under high pressure from the combustion chamber system 21. At the time of discharge, the notch in the control disc 23 opens the transfer channel 22, while the transfer channel 27 is maintained closed. The gases under high pressure therefore flow into receiver 24 and through the nozzle ring 25, thus impinging upon the outer circumference of the turbine blade ring 26. As the pressure of the discharging gases decrease, as the control disc 23 further rotates, the transfer channel 22 is closed and the transfer channel 27 is opened. The gases discharging from the combustion chamber system 21 but now at a lower pressure, pass through the transfer channel 27 and the notch in the control disc 23 into the receiver 28, and through the nozzle ring 29 to impinge upon the inner circumference of the turbine blade ring 26. The expansion through the transfer channel 27, receiver 28, and inner nozzle ring 29 takes place until the working gas expands to the pressure of the compressor, or, preferably, for better scavenging and charging, to a lower pressure. By expansion to a lower pressure than the compressor pressure before combustion chamber system, the kinetic energy of the discharging gases is utilized for the scavenging and charging of the combustion chamber. The control disc 23 then closes the transfer channel 27 and receiver 28. The next combustion chamber system 21, annularly positioned in the direction of rotation of the control disc 23, is then operated in identical manner with the opening of the transfer channels 22 and 27 in sequence.

When operating the discharge control as is illustrated above in connection with the combustion chamber system as shown in Fig. 1, the control disc 23 takes the place of the control disc 3 and the discharge opening 14 is sub-divided into the transfer channels 22 and 27.

As illustrated, the discharge control from a group of annularly arranged intermittently operating combustion chamber systems is so constructed that the gas flow is divided into several partial streams by means of rotating control means and channelling means, and these partial streams are directed to a single turbine wheel. This provides a great advantage of utilizing a single turbine wheel with high efficiency, heat-gradient of different magnitude and permits, for the sake of uniform stress of the material, higher temperatures at the blade tips.

Figure 8:
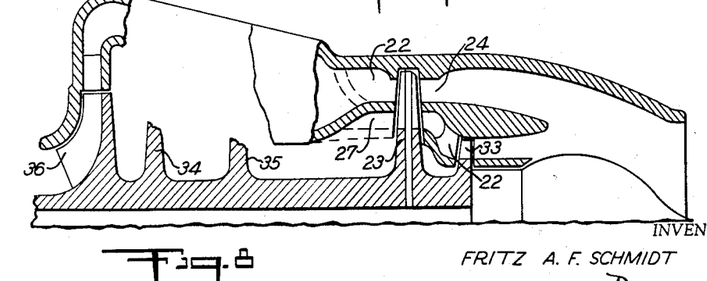
Fig. 8 is a diagrammatic vertical section of an embodiment of a discharge control for pulse jets in accordance with the invention.
Figure 9:
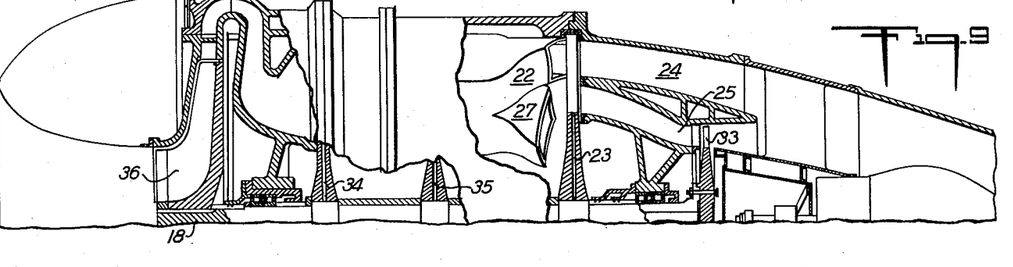
Fig. 9 is a side elevation showing the pulse jet diagrammatically illustrated in Fig. 8 with the casing partially cut away and partially in section.

The embodiment as shown in Figs. 8 and 9 illustrates the application of the discharge control in accordance with the invention in connection with pulse jets. In the pulse jet illustrated, a rotatable shaft 18 extends coaxially to the axis of rotation of the engine. Connected for rotation with this shaft is the compressor 36, the control discs 34 and 35 for the combustion chamber, the control disc for controlling the discharge 23, and the ring of turbine blades 33. Air drawn in from the front of the engine compressed with the compressor 36, passes into the combustion chamber, which is controlled by the control discs 34 and 35. A number of combustion chambers are annularly positioned toward the axis of the engine, all being controlled by the control discs 34 and 35. These chambers may, for example, operate in the same manner as in the embodiment as shown in Fig. 1, the control disc 34 corresponding to control disc 1, and the control disc 35 corresponding to the control disc 2. The combustion chambers may, however, also operate on any other intermittent combustion principle and need not have the control discs. The discharge from each of the combustion chambers is radially subdivided by an inner transfer channel 27 and an outer transfer channel 22. Transfer channels 22 and 27 are identical in structure and operation, as those described in connection with Figs. 5 and 6. In the same manner the operation and construction of the control disc 23 is identical with that described in connection with Figs. 5, 6, and 7. The outer transfer channel 22, which is intermittently communicated with the receiver 24 by means of the control disc 23, passes the larger portion of the expansion ratio of the intermittently operating combustion chamber through the receiver 24 directly through the thrust jet. The smaller portion of the expansion ratio is utilized in a shunt flow through the thrust jet. The smaller portion of the expansion ratio is utilized in a shunt flow through the transfer channel 27, receiver 28, to the auxiliary gas turbine 33, and then is returned to the main flow. The auxiliary gas turbine 33 drives the shaft 18 or its connected rotating part, including the compressor 36 and the control discs. The size and pressure range of the auxiliary gas turbine flow are determined by the type size of the turbine.

Figure 10:
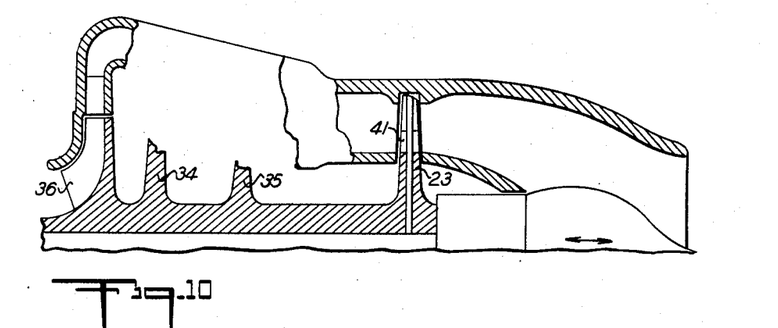
Fig. 10 is a diagrammatic vertical section showing an embodiment of the discharge control in accordance with the invention with a turbo-segment.
Figures 11, 11A:
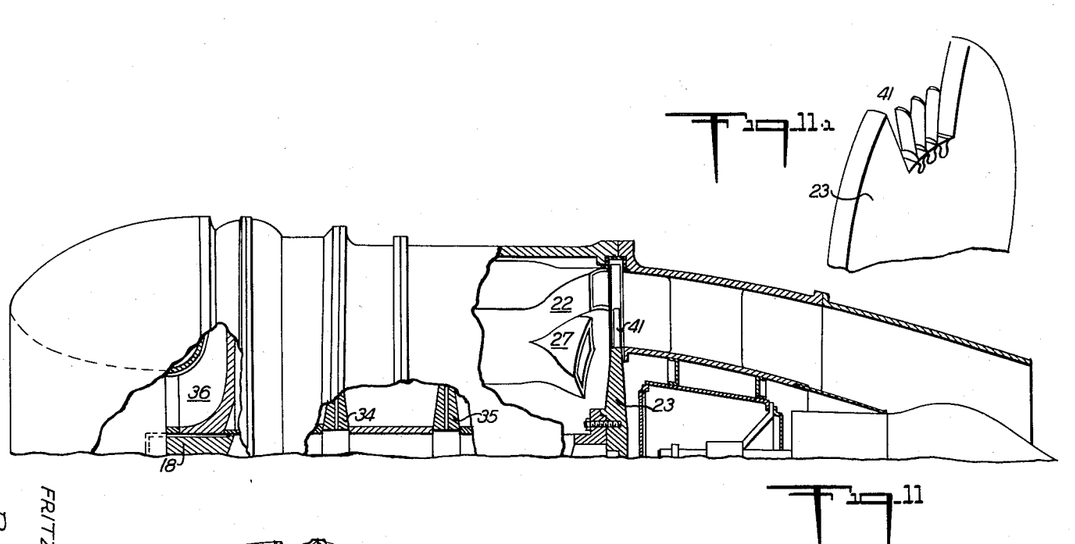
Fig. 11 is a side elevation of a pulse jet engine, utilizing the control illustrated in Fig. 10 and shown with the casing partially cut away and partially in section.
Fig. 11a is a perspective view of a portion of the control member with the turbo-segment shown in Fig. 11.

The embodiment as shown in Figs. 10 and 11 is identical in construction and operation with that shown in Figs. 8 and 9, except that the auxiliary turbine 33 and receivers 24 and 28 are eliminated. The control disc 23 is so constructed that turbine blades 41 are positioned in the lower portion of the notch which opens transfer channels 22 and 27, respectively. The height of the blades 41 is such that gas passing through the inner transfer channel 27 will impinge on the same, while gas being discharged through the outer transfer channel 22, will pass over the blades through the notch and not impinge on the same. In operation, the gas discharging from the combustion chamber during the latter portion of the discharge cycle at the lower pressure passes through the transfer channel 27 in the identical manner as described in connection with Figs. 8 and 9. This gas, however, impinges upon the blades of the blade segment 41 and imparts rotary motion to the control disc 23, which drives the shaft 18 with the connected rotating members, including the compressor 36 and other control discs. The use of the turbine blade segment in the notch of the control disc allows the control disc to be driven directly by the gases discharging at lower pressure and may also be utilized for driving the other rotating parts of the engine.

An example of a control diagram for all the above embodiments is illustrated in Fig. 12. In this diagram, the inner ring shows the opening and closing of the inner transfer channel 27 by the control disc 23 and in the outer ring shows the opening and closing of the outer transfer channel 22 by the control disc 23.

As may be seen from the above embodiments, the gases issuing in chronological sequence from the intermittently operating combustion chambers, are discharged, first with a larger usable heat drop and higher pressure and temperature, and then with a smaller usable heat drop and lower pressure and temperature into two or more transfer channels which, respectively, lead to radially separated groups of nozzles of a single turbine wheel, or partially to a thrust jet, and partially to radially operated nozzle groups of a gas turbine.

I claim:

1. In a gas impulse engine a multiple number of annularly arranged primary and associated secondary combustion chambers, each said primary and secondary combustion chambers having a separate gas inlet opening and gas discharge opening, the gas discharge opening defined by each said primary combustion chamber leading into its said associated secondary combustion chamber, ignition means positioned in said primary combustion chamber, and rotating control discs for opening and closing said inlet and discharge openings in timed sequence for the scavenging and charging of the primary combustion chambers, combustion in the primary combustion chambers by means of said ignition means, and the discharge of the combustion gases with high turbulence to the associated secondary combustion chambers, and for charging and scavenging the secondary combustion chambers, closing these chambers, for receipt of the combustion gases from the primary combustion chambers with high turbulence and thereafter for gas discharge therefrom said control discs comprising a rotating control disc for the inlet openings of said primary and secondary chambers, a rotating control disc for the discharge opening of said primary combustion chamber and a rotating control disc for the discharge opening of said secondary combustion chamber.

2. System according to claim 1 in which the discharge opening of said secondary chamber is sub-divided into a first transfer channel and a second transfer channel positioned radially inwardly thereof, and in which said rotating disc for the discharge opening of said secondary combustion chamber is dimensioned for, in chronological sequence, opening and closing said first and second transfer channels.

3. System according to claim 2 in which the trailing edge of said first transfer channel in the plane and direction of rotation of said disc is substantially radially in line with the leading edge of said second transfer channel.

4. System according to claim 3 in which said first transfer channel leads to an annular receiver and in which said second transfer channel leads to a second annular receiver concentrically positioned within said first receiver.

5. System according to claim 4 in which the first receiver leads through a nozzle section to the outer circumferential portion of a turbine blade ring and in which said second receiver leads through a separate nozzle section to the inner circumferential portion of said turbine blade ring.

6. System according to claim 4 in which the second receiver leads to a ring of turbine blades and in which said first receiver leads to a thrust jet.

7. System according to claim 2 in which the control disc for the discharge from said secondary combustion chamber has a turbine blade section positioned to be impinged on by gas discharging through said second transfer channel.

8. System according to claim 1, in which said rotating control discs are dimensioned and positioned for opening the gas discharge opening defined by each said primary combustion chamber leading into its associated secondary combustion chamber, a predetermined time prior to the opening of the discharge opening defined by its associated secondary combustion chamber and for maintaining both said discharge openings open for a portion of the cycle.

9. System according to claim 1 in which the inlet openings of the primary and secondary chambers are circumferentially staggered with respect to each other by the amount of the phase angle between inlet opening of the primary and secondary chambers.

10. System according to claim 1 in which said discharge openings and said rotating control discs are dimensioned and positioned so that gas flowing through said discharge openings will effect a rotational impulse upon said control members.

11. In a gas-impulse engine having multiple number of annularly positioned intermittently operating combustion chambers with a pressure drop during the discharge event, the improvement in the discharge control which comprises means defining a discharge opening from each combustion chamber sub-divided into a first transfer channel and a second transfer channel positioned radially inwardly thereof, and rotating control disc for discharge opening and closing of said first and said second transfer channel in chronological sequence the trailing edge of said first transfer channel in the plane and direction of rotation of said disc being substantially radially in line with the leading edge of said second transfer channel.

12. Improvement according to claim 11 in which said first transfer channel leads to an annular receiver and in which said second transfer channel leads to a second annular receiver concentrically positioned within said first receiver.

13. Improvement according to claim 12 in which said first receiver leads through a nozzle section to the outer circumferential portion of a turbine blade ring and in which said second receiver leads through a separate nozzle section to the inner circumferential portion of said turbine blade ring.

14. Improvement according to claim 12 in which the second receiver leads to a ring of turbine blades and in which said first receiver leads to a thrust jet.

15. Improvement according to claim 11 in which said control disc has a turbine blade section positioned to be impinged on by gas discharging through said second transfer channel.

16. Improvement according to claim 11 in which said rotating control disc has at least one fluid cooling channel defined therein.

17. System according to claim 1 in which said rotating control discs have at least one fluid cooling channel defined therein.

18. Combustion chamber system according to claim 1, including a common gas duct leading to the inlet opening of said primary and secondary chambers.

19. Combustion chamber system according to claim 1, in which said rotating control discs are dimensioned and positioned for opening the gas-discharge opening defined by each said primary combustion chamber leading into the secondary combustion chamber a predetermined time prior to the opening of the discharge opening defined by said secondary combustion chamber and for maintaining both said discharge openings open for a portion of the cycle, and in which the inlet openings of the primary and secondary chambers are circumferentially staggered with respect to each other by the amount of the phase angle between the inlet opening of the primary and secondary chambers.

20. In a gas impulse engine a multiple number of annularly positioned primary combustion chambers, and associated therewith secondary combustion chambers, each of said primary and secondary combustion chambers having a separate gas inlet opening and gas discharge opening, the gas discharge opening defined by each said primary combustion chamber leading into its associated secondary combustion chamber, the gas discharge opening defined by each said secondary combustion chamber being subdivided into a first transfer channel and a second transfer channel positioned radially inward thereof, ignition means positioned in said primary combustion chambers, rotating control disc for opening and closing said inlet and discharge openings in timed sequence for the scavenging and charging of the primary combustion chambers, combustion in the primary combustion chambers by means of said ignition means, and the discharge of the combustion gases with high turbulence to the associated secondary combustion chambers and for the scavenging and charging of the secondary combustion chambers, closing these chambers, for receipt of the combustion gases from the primary combustion chamber with high turbulence and thereafter for gas discharge therefrom, and a rotating control disc for discharge opening and closing of said first and second transfer channel in chronological sequence said first mentioned rotating control discs comprising a rotating control disc for the inlet openings of said primary and secondary chambers, a rotating control disc for the discharge openings of said primary combustion chambers and a rotating control disc for the discharge opening of said secondary combustion chambers.

References Cited in the file of this patent

UNITED STATES PATENTS

| 1,129,544 | Bischof | Feb. 23, 1915 |
| 2,195,025 | Couzinet | Mar. 26, 1940 |
| 2,369,795 | Planiol et al. | Feb. 20, 1945 |
| 2,517,822 | Anderson | Aug. 8, 1950 |
| 2,659,198 | Cook | Nov. 17, 1953 |
| 2,750,147 | Smith | June 12, 1956 |

FOREIGN PATENTS

| 97,359 | Austria | June 25, 1924 |
| 22,493 | France | Jan. 22, 1921 |
| 384,532 | Germany | Nov. 2, 1923 |
| 387,166 | Germany | Dec. 21, 1923 |
| 416,030 | Great Britain | Sept. 3, 1934 |
| 452,297 | Great Britain | Aug. 20, 1936 |
| 215,484 | Switzerland | Oct. 1, 1941 |